(12) United States Patent
Xavier et al.

(10) Patent No.: US 11,063,793 B1
(45) Date of Patent: Jul. 13, 2021

(54) SERIAL RECEIVER EQUALIZATION CIRCUIT

(71) Applicant: TEXAS INSTRUMENTS INCORPORATED, Dallas, TX (US)

(72) Inventors: Ani Xavier, Bengaluru (IN); Jagannathan Venkataraman, Bengaluru (IN); Sandeep Oswal, Bengaluru (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/876,308

(22) Filed: May 18, 2020

(51) Int. Cl.
*H04L 27/01* (2006.01)
*H04L 25/03* (2006.01)

(52) U.S. Cl.
CPC .. *H04L 25/03885* (2013.01); *H04L 25/03267* (2013.01); *H04L 27/01* (2013.01)

(58) Field of Classification Search
CPC ............... H04L 27/01; H04L 25/03878; H04L 25/03885; H04L 2025/0349; H04L 25/03267
See application file for complete search history.

(56) References Cited

U.S. PATENT DOCUMENTS

| | | | | |
|---|---|---|---|---|
| 8,054,876 B2* | 11/2011 | Tsai | ......................... | H03H 11/28 375/233 |
| 2008/0159415 A1* | 7/2008 | Miller | .................... | H04L 25/063 375/258 |
| 2012/0027074 A1* | 2/2012 | Raghavan | ............... | H04L 25/10 375/233 |
| 2018/0248577 A1* | 8/2018 | Hossain | ................... | H04L 27/01 |

* cited by examiner

*Primary Examiner* — David S Huang
(74) *Attorney, Agent, or Firm* — John R. Pessetto; Charles A. Brill; Frank D. Cimino (57) ABSTRACT

An equalization circuit includes a feed-forward equalization (FFE) circuit and a decision feedback equalization (DFE) circuit. The FFE circuit includes a first FFE tap, a second FFE tap coupled to the first FFE tap, and a variable gain amplifier. The variable gain amplifier includes an input and a programmable capacitor. The input is coupled to the first FFE tap and the second FFE tap. The programmable capacitor is coupled to the input. The DFE circuit includes an input and a DFE tap. The input is coupled to the variable gain amplifier. The DFE tap is coupled to the input of the variable gain amplifier.

22 Claims, 8 Drawing Sheets

SERIAL RECEIVER EQUALIZATION CIRCUIT

BACKGROUND

Serial communication links experience high frequency distortion (phase and amplitude) between the transmitter and receiver over a lossy channel. This distortion is manifested at the receiver as inter-symbol interference, i.e., a smearing of the transmitted data bits/symbols. Channel equalization is used to counteract inter-symbol interference end other channel induced distortion. Channel equalization is applied using transmission pre-emphasis that pre-distorts a transmit signal and/or as receiver equalization that applies post-compensation for the undesirable frequency effects of the channel.

SUMMARY

A receiver equalization circuit that integrates feed forward equalization (FFE), decision feedback equalization (DFE), and gain in a single equalization stage is disclosed herein. In one example, an equalization circuit includes an FFE circuit and a DFE circuit. The FFE circuit includes a first FFE tap, a second FFE tap, and a variable gain amplifier. The variable gain amplifier includes an input and a programmable capacitor. The input is coupled to the first FFE tap and the second FFE tap. The programmable capacitor is coupled to the input. The DFE circuit includes a signal input and a DFE tap. The signal input is coupled to the variable gain amplifier. The DFE tap is coupled to the input of the variable gain amplifier.

In another example, a receiver equalization circuit includes an FFE circuit and a DFE circuit. The FFE circuit includes a plurality of FFE taps and a variable gain amplifier. The variable gain amplifier includes an input and a programmable capacitor. The input is coupled to the plurality of FFE taps. The variable gain amplifier is configured to change gain by changing a capacitance of the programmable capacitor. The DFE circuit includes a signal input and a DFE tap. The signal input is coupled to an output the variable gain amplifier. The DFE tap is coupled to the input of the variable gain amplifier.

In a further example, an equalizer circuit includes a linear equalizer circuit, an FFE circuit, a DFE circuit, and a reference circuit. The FFE circuit includes an input, a first FFE tap, a second FFE tap, a variable gain amplifier, a first switch, a second switch, and a third switch. The input is coupled to an output of the linear equalizer circuit. The variable gain amplifier includes an input coupled to the first FFE tap and the second FFE tap, and a programmable capacitor. The programmable capacitor is coupled to the input of the variable gain amplifier, and is configured to change capacitance to adjust a gain of the variable gain amplifier. The first switch includes a first terminal coupled to an output of the variable gain amplifier. The second switch includes a first terminal coupled to the first terminal of the first switch, and a second terminal coupled to a ground rail. The third switch includes a first terminal coupled to the second terminal of the first switch, and a second terminal coupled to the ground rail. The DFE circuit includes a first slicer circuit, a second slicer circuit, a third slicer circuit, and a DFE tap. The first slicer circuit, the second slicer circuit, and the third slicer circuit are coupled to a second terminal of the first switch. The DFE tap is coupled to the input of the variable gain amplifier. The reference circuit includes a reference voltage source, a first switch, a second switch, a third switch, a fourth switch, a fifth switch, and a sixth switch. The first switch of the reference circuit includes a first terminal coupled to a first output of the reference voltage source, and a second terminal coupled to a reference input of the first slicer circuit. The second switch of the reference circuit includes a first terminal coupled to the first terminal of the first switch of the reference circuit, and a second terminal coupled to a ground rail. The third switch of the reference circuit includes a first terminal coupled to the second terminal of the first switch of the reference circuit, and a second terminal coupled to the ground rail. The fourth switch of the reference circuit includes a first terminal coupled to a second output of the reference voltage source, and a second terminal coupled to a reference input of the second slicer circuit. The fifth switch of the reference circuit includes a first terminal coupled to the first terminal of the fourth switch of the reference circuit, and a second terminal coupled to a ground rail. The sixth switch of the reference circuit includes a first terminal coupled to the second terminal of the fourth switch of the reference circuit, and a second terminal coupled to the ground rail.

BRIEF DESCRIPTION OF THE DRAWINGS

For a detailed description of various examples, reference will now be made to the accompanying drawings in which.

DETAILED DESCRIPTION

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

With increasing serial communication data rates, four level pulse amplitude modulation (PAM4) is becoming increasingly popular. While use of PAM4 doubles the data rate, receiver specifications are more stringent (than with non-return to zero encoding) because of the reduced amplitude of PAM4 signals, increased inter-symbol interference, and lower signal amplitude.

In the serial communication systems disclosed herein, the receivers include an equalization circuit that combines a feedforward equalization (FFE) circuit, a decision feedback equalization (FFE) circuit, and a variable gain amplifier in one equalization stage. Reducing the number of filter stage reduces noise in the receivers. The FFE is implemented as an analog circuit that provides a de-emphasis function that attenuates low frequencies relative to high frequencies. The variable gain amplifier recovers signal amplitude loss in the FFE circuit.

The variable gain amplifier includes a programmable capacitor that allows the gain of the amplifier to be adjusted by changing the capacitance applied to integrate the currents flowing into the amplifier from the taps of the FFE and the DFE. The output of the variable gain amplifier is sampled for slicing in the DFE. To reduce the effects of clock jitter on the slicing, the reference voltage provided to the slicers is sampled using the same sampling clock applied to sample the output of the variable gain amplifier.

Figure 1:
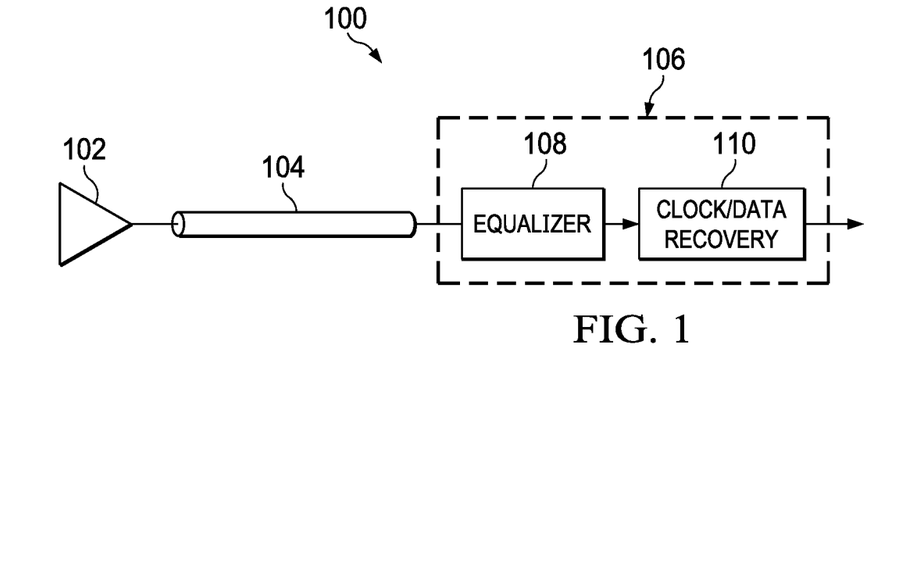
FIG. 1 shows a block diagram for an example serial communication system in accordance with the present disclosure.

FIG. 1 shows a block diagram for an example serial communication system 100 in accordance with the present disclosure. The serial communication system 100 includes a transmitter 102, a channel 104, and a receiver 106. The channel 104 conditions data for transmission to the receiver 106 via the channel 104. For example, the transmitter 102 transmits data using PAM4 modulation in some implementations of the serial communication system 100. The channel 104 is an electrically or optically conductive medium in some implementations of the serial communication system 100.

The receiver 106 extracts clock and data signals from the transmissions received via the channel 104. The receiver 106 includes an equalizer 108 and a clock/data recovery circuit 110. The equalizer 108 compensates for distortion of the received signal caused by the channel 104. For example, the equalizer 108 boosts high frequency content of the received signal to compensate for attenuation of high frequencies in the channel 104. The clock/data recovery circuit 110 extracts clock and data signals from the equalized signals provided by the equalizer 108.

Figure 2:
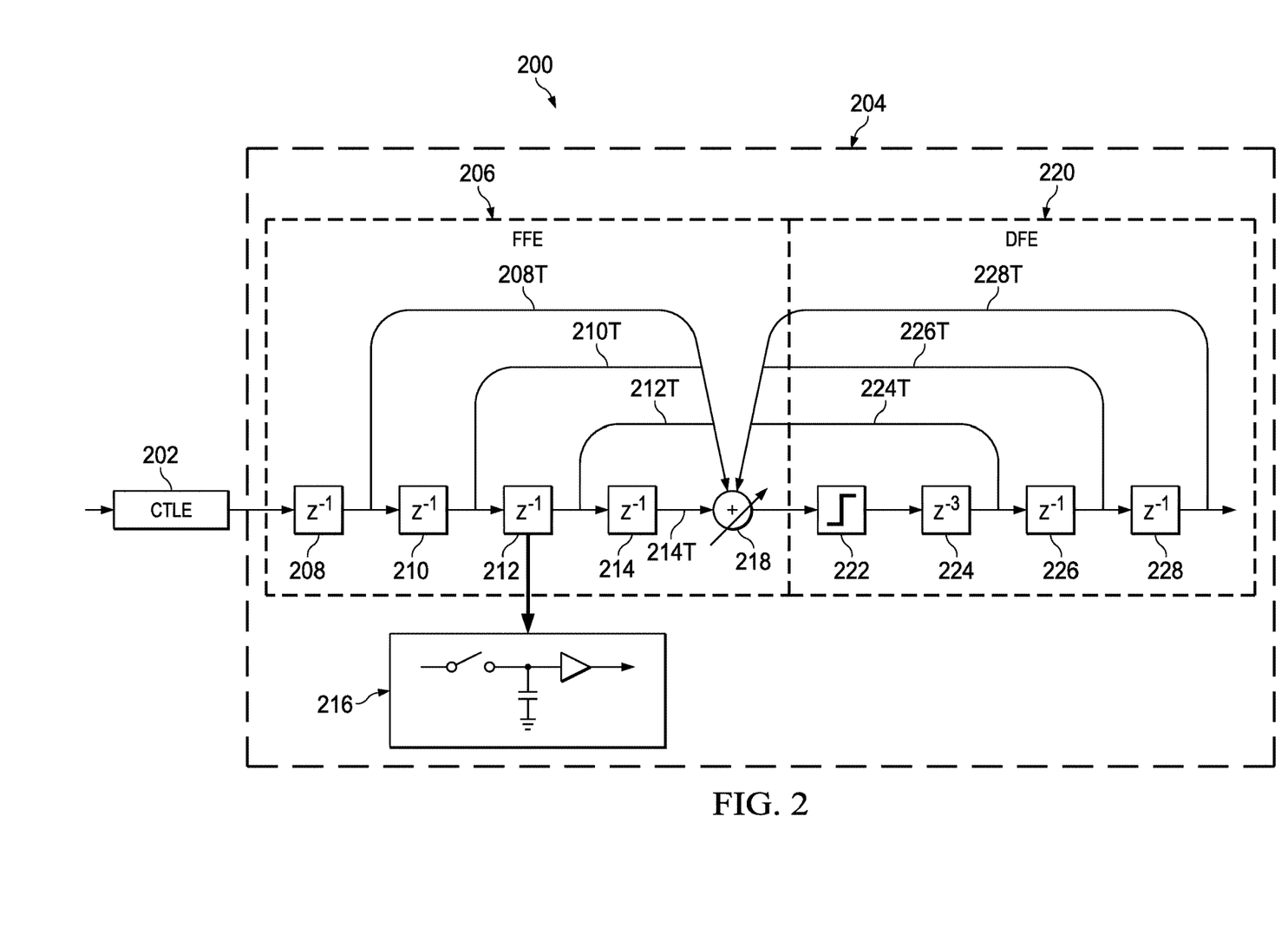
FIG. 2 shows a block diagram for an example equalization circuit in accordance with the present disclosure.

FIG. 2 shows a block diagram for an example equalization circuit 200 in accordance with the present disclosure. The equalization circuit 200 is an implementation of the equalizer 108. The equalization circuit 200 includes a linear equalizer circuit 202, illustrated as a continuous-time-linear-equalizer, a feed-forward equalization (FFE) circuit 206, and decision-feedback equalization (DFE) circuit 220. The FFE circuit 206 and the DFE circuit 220 are combined in a single equalization stage or equalization circuit 204.

The linear equalizer circuit 202 boosts the high frequency content of received signal, which includes boosting high frequency noise accompanying the signal.

The FFE circuit 206 includes delay circuits 208, 210, 212, and 214 and variable gain amplifier 218. The FFE circuit 206 is an analog circuit, and the delay circuits 208, 210, 212, and 214 are implemented as instances of the sample and hold circuit 216 for example. Outputs of the delay circuits 208, 210, 212, and 214 form FFE taps 208T, 210T, 212T, and 214T that are coupled to an input of the variable gain amplifier 218 for summation and amplification. A selected gain value is applied to the signal at each of the FFE taps 208T, 210T, 212T, and 214T. While the FFE circuit 206 is illustrated in FIG. 2 as included four FFE taps, implementations of the FFE circuit 206 may include any number of FFE taps.

The DFE circuit 220 is coupled to the output of the variable gain amplifier 218. The DFE circuit 220 includes one or more slicers 222 and delay circuits 224, 226, and 228. The slicers 222 are implemented using comparators, and the delay circuits 224, 226, and 228 are implemented using flip-flops in some implementations of the DFE circuit 220. The slicers 222 compare signal provided by the variable gain amplifier 218 to reference voltages to determine bit values of the signal received by the equalization circuit 200. The outputs of the delay circuits 224, 226, and 228 form DFE taps 224T, 226T, and 228T that are coupled to an input of the variable gain amplifier 218 for summation and amplification.

Figure 3:
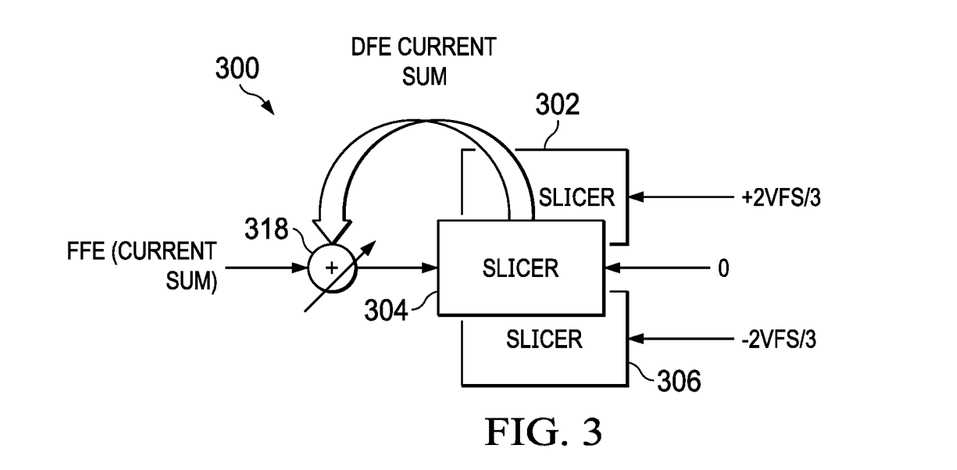
FIG. 3 shows a block diagram for an example equalization circuit for use with four level pulse amplitude modulation in accordance with the present disclosure.

FIG. 3 shows a block diagram for an example equalization circuit 300 for use with PAM4 modulation in accordance with the present disclosure. The equalization circuit 300 is an implementation of the equalization circuit 200, and includes slicer 302, slicer 304, and slicer 306. A weighted sum of the slicer outputs (delayed) is provided to a variable gain amplifier 318. Similarly, a weighted sum of the tap output signals of the FFE are provided to the variable gain amplifier 318. The variable gain amplifier 318 is an implementation of the variable gain amplifier 218, and the slicer 302, the slicer 304, and the slicer 306 are instances of the slicers 222.

With the three slicers 302, 304, and 306 of the equalization circuit 300, the full-scale voltage (VFS) of the output of the FFE is adapted to be the same across different FFE coefficients. Accordingly, the variable gain amplifier 318 varies the gain applied to the FFE output to provide the desired VFS signal swing to the slicers 302, 304, and 306.

$$VFS=G(Vin-\Sigma FFE)-\Sigma DFE$$

$$G(Vin-\Sigma FFE)=VFS+\Sigma DFE$$

where:
G is gain applied in the variable gain amplifier 318;
Vin is the FFE input signal;
ΣFFE is the sum of the FFE tap output signals; and
ΣDFE is the sum of the DFE tap output signals.

Figure 4A:
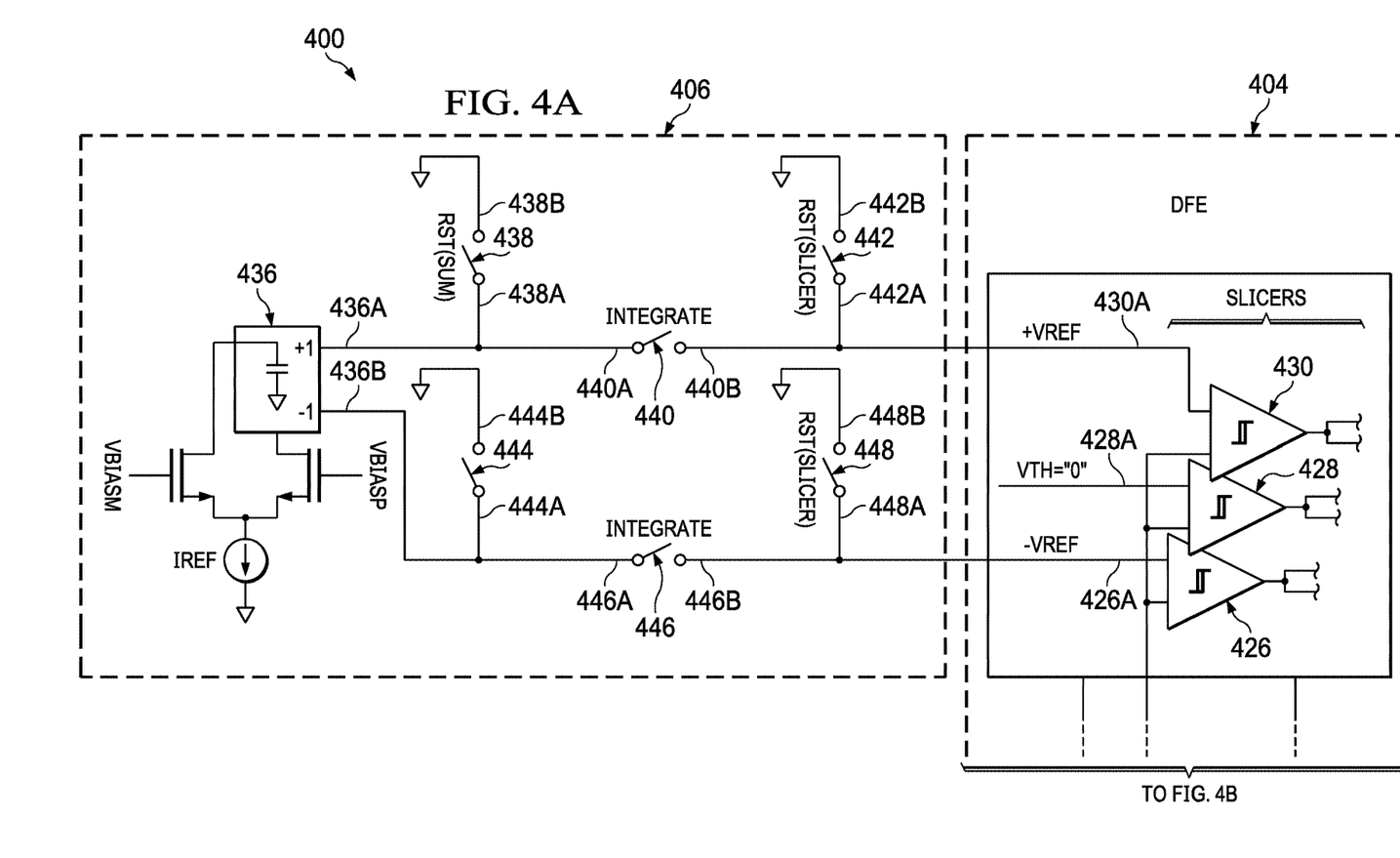
FIGS. 4A and 4B shows a schematic diagram for an example equalization circuit in accordance with the present disclosure.
Figure 4B:
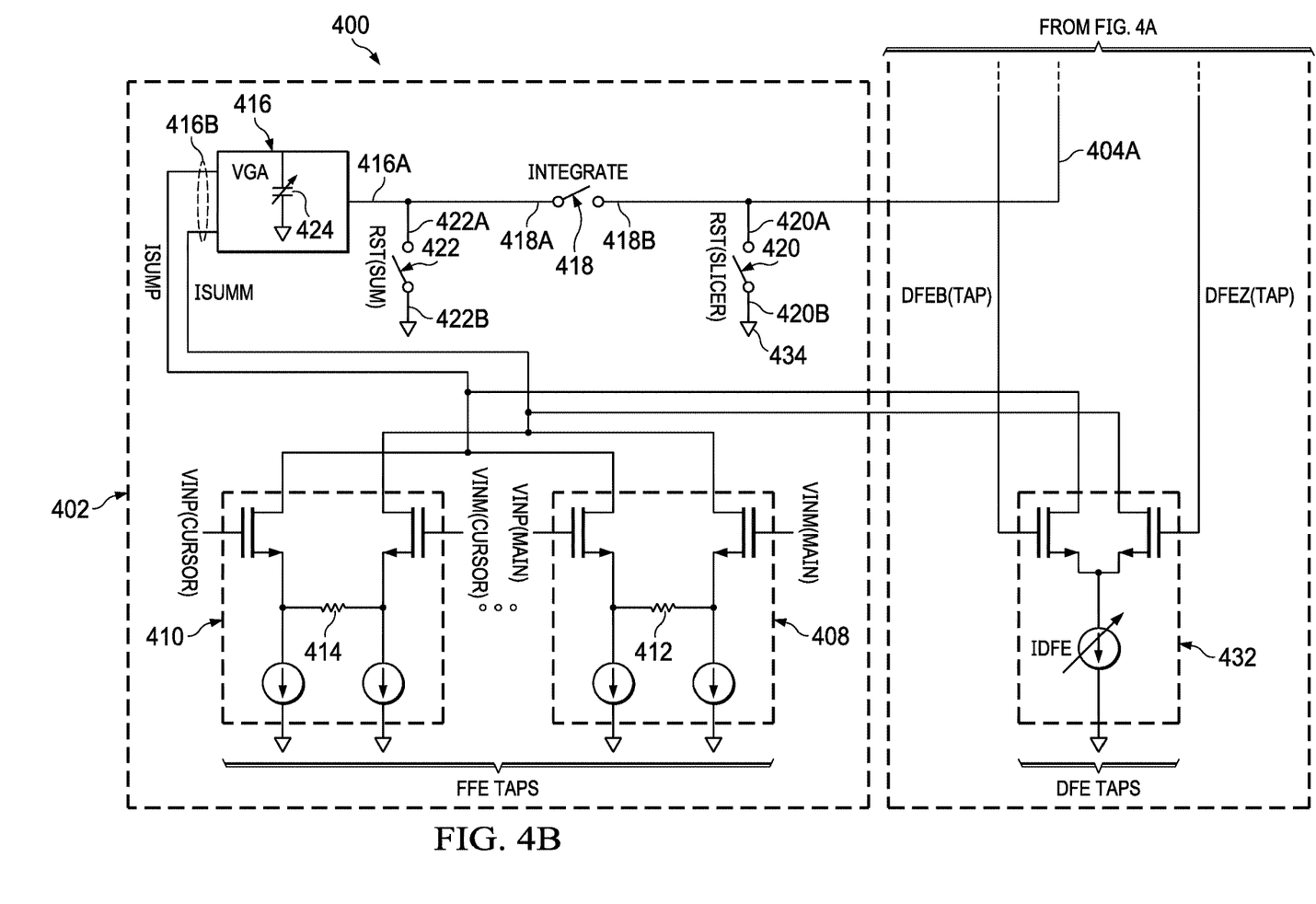

FIGS. 4A and 4B shows a schematic diagram for an example equalization circuit 400 in accordance with the present disclosure. The equalization circuit 400 is an implementation of the equalization circuit 200 or the equalization circuit 300, and provides an FFE, a DFE, and gain in a single stage. The equalization circuit 400 includes an FFE circuit 402, a DFE circuit 404, and a reference circuit 406. The FFE circuit 402 is an implementation of the FFE circuit 206 and the DFE circuit 404 is an implementation of the DFE circuit 220. The FFE circuit 402 includes a plurality of FFE taps shown as a main FFE tap 408 and a cursor FFE tap 410, a variable gain amplifier 416, a switch 418, a switch 420, and a switch 422. The cursor FFE tap 410 may be a precursor or a postcursor tap. While two FFE taps are shown in FIG. 4B, implementations of the FFE circuit 402 include any number of FFE taps.

Each of the FFE taps (e.g., main FFE tap 408, cursor FFE tap 410) includes a pair of transistors and a degeneration resistor 412, 414 to improve input linearity. The transconductance of the transistors is varied as function of the gain coefficient applied at each tap.

The FFE taps are coupled to and the currents generated in each of the FFE taps are summed at the input 416B of the variable gain amplifier 416. The variable gain amplifier 416 includes a programmable capacitor 424 coupled to the input 416B. The capacitance of the programmable capacitor 424 is changed to adjust the gain of the variable gain amplifier 416. The programmable capacitor 424 is implemented as a bank of selectable capacitors in some examples of the variable gain amplifier 416. Using the programmable capacitor 424, the equalization circuit 400 operates as a current/capacitance (I/C) integrator where $$\text{Gain} = \frac{IT}{C},$$

C is capacitance of the programmable capacitor 424, I is current at the input 416B of the variable gain amplifier 416, and T is integration time. An output 416A of the variable gain amplifier 416 is coupled to a signal input 404A of the DFE circuit 404 via the switch 418. The switch 420 is coupled to the signal input 404A of the DFE circuit 404 to reset the input voltage provided to the DFE circuit 404. The switch 422 is coupled to the output of the variable gain amplifier 416 to reset the output of the variable gain amplifier 416.

The switch 418 includes a terminal 418A coupled to the output 416A of the variable gain amplifier 416, and a terminal 418B coupled to the signal input 404A of the DFE circuit 404. The switch 420 includes a terminal 420A coupled to the terminal 418B of the switch 418, and a terminal 420B coupled to a common mode voltage source 434. The switch 422 includes a terminal 422A coupled to the terminal 418A of the switch 418, and a terminal 422B coupled to the common mode voltage source 434.

The DFE circuit 404 includes slicer 426, slicer 428, slicer 430, and one or more DFE taps. While only DFE tap 432 is shown in FIG. 4B, implementations of the DFE circuit 404 include any number of DFE taps. Each of the slicers 426, 428, and 430 is coupled to the signal input 404A of the DFE circuit 404, and thereby coupled to terminal 418B of the switch 418 for receipt of output of the variable gain amplifier 416. Each of the slicers 426, 428, and 430 compares the signal received at the signal input 404A to a different reference voltage. Outputs of the slicers 426, 428, and 430 are delayed, and the delayed outputs of the slicers 426, 428, and 430 drive the DFE taps. For example, a delayed output of the slicers 426, 428, or 430 drive the DFE tap 432. The DFE tap 432 (and each DFE tap of the DFE circuit 404) is coupled to the input 416B of the variable gain amplifier 416 and the current output of the DFE tap 432 is summed with the outputs of the FFE taps 408 and 410 to charge the programmable capacitor 424.

*I*SUM=*I*FFE+*I*DFE

*I*FFE=*G* Min 1(*V*in(main))+*G* Min 2(*V*in(tapa)) . . .

*I*DFE=*I*DFE(TAP)(DFE*B*(TAP)−DFEZ(TAP)) . . .

In the equalization circuit 400, jitter in the clock generating the timing for the switches 418, 420, and 422 produces variation in integration time and noise in the signal provided to the DFE circuit 404. The reference circuit 406 mitigates the effects of clock jitter by applying the same clock used to control integration of the signal provided to the DFE circuit 404 to generate the reference voltages for the DFE circuit 404. Thus, the noise generated in the reference voltages correlates with and cancels the noise generated in the signal provided to the DFE circuit 404 by the FFE circuit 402. The reference circuit 406 includes a reference voltage source 436, a switch 438, a switch 440, a switch 442, a switch 444, a switch 446, and a switch 448. Various implementations of the equalization circuit also include clock rate, process, voltage, and temperature based reference current generation as explained with respect to FIGS. 6A and 6B.

The switch 440 includes a terminal 440A coupled to an output 436A of the reference voltage source 436, and a terminal 440B coupled to a reference input 430A of the slicer 430. The switch 438 includes a terminal 438A coupled to the terminal 440A of the switch 440, and a terminal 438B coupled to the common mode voltage source 434. The switch 442 includes a terminal 442A coupled to the terminal 440B of the switch 440, and a terminal 442B coupled to the common mode voltage source 434.

The switch 446 includes a terminal 446A coupled to an output 436B of the reference voltage source 436, and a terminal 446B coupled to a reference input 426A of the slicer 426. The switch 444 includes a terminal 444A coupled to the terminal 446A of the switch 446, and a terminal 444B coupled to the common mode voltage source 434. The switch 448 includes a terminal 448A coupled to the terminal 446B of the switch 446, and a terminal 448B coupled to the common mode voltage source 434.

Figure 5:
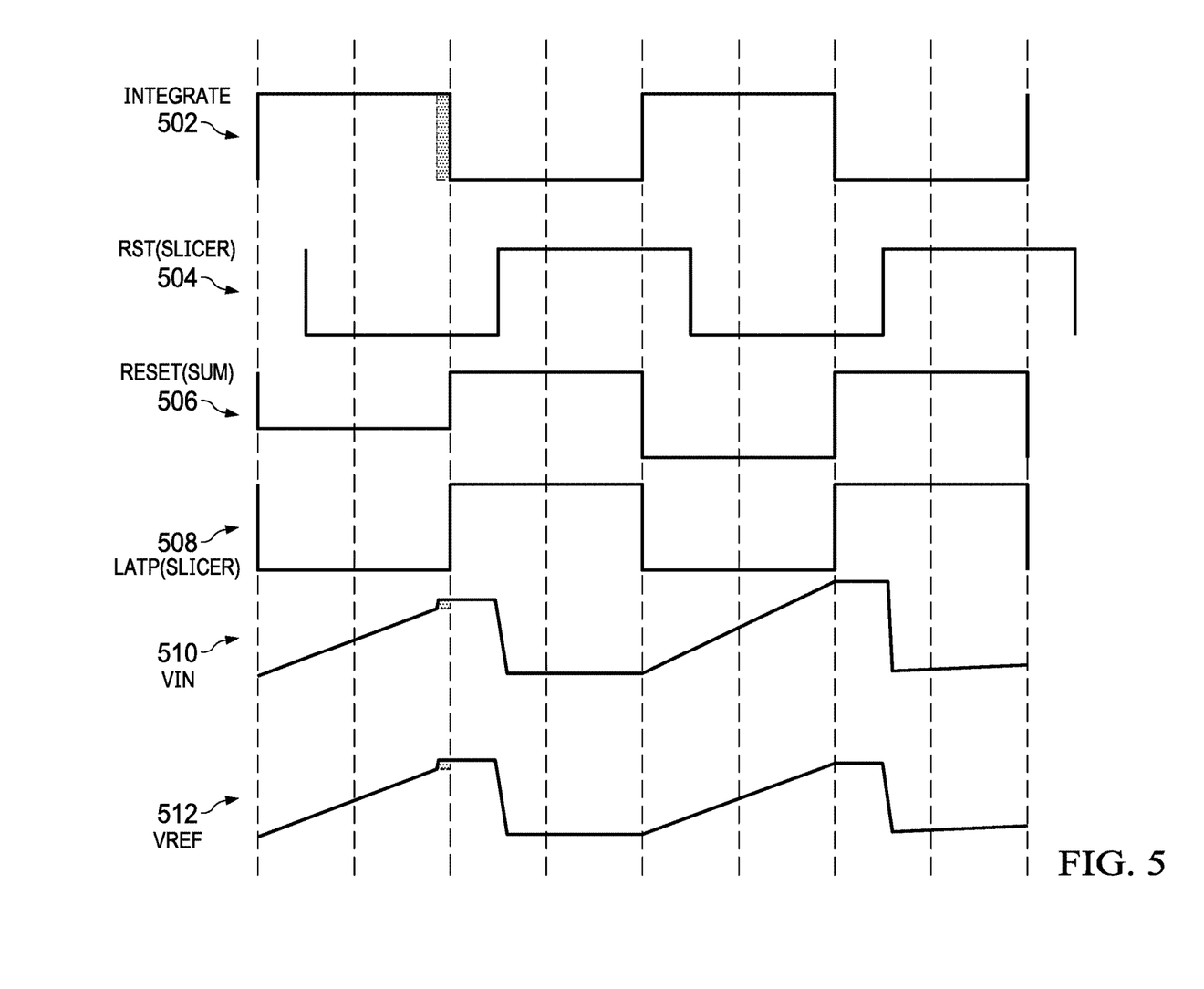
FIG. 5 shows example signals generated in an equalization circuit in accordance with present disclosure.

FIG. 5 shows example signals generated in an implementation of the equalization circuit 400. The INTEGRATE signal 502 controls the switches 418, 440, and switch 446. The RST(SLICER) signal 504 controls the switches 420, 442, and 448. The RST(SUM) signal 506 controls the switches 422, 438, and 444. The LATP(SLICER) signal controls latching in the slicers 426, 428, and 430. The VIN signal 510 is the integrated voltage provided at the signal input 404A of the DFE circuit 404. The VREF signal 512 is the voltage reference signal provided at the reference input 430A of the slicer 430. As illustrated in FIG. 5, jitter in the INTEGRATE signal 502 produces noise in the VREF signal 512 that cancels the effect of the jitter in the VIN signal 510.

Figure 6A:
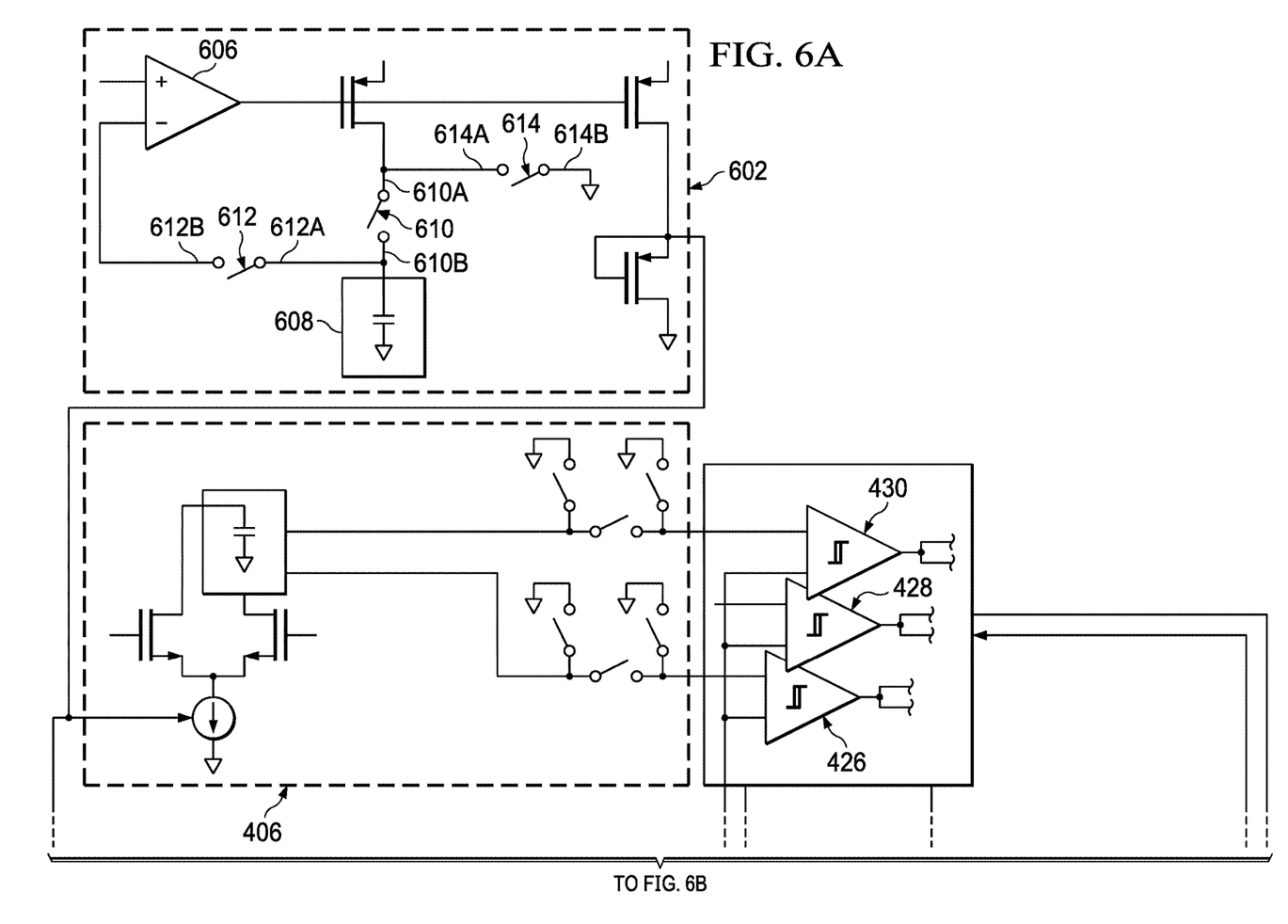
FIGS. 6A and 6B shows an example bias circuit and an example reference slicer circuit applied in an equalization circuit in accordance with the present disclosure.
Figure 6B:
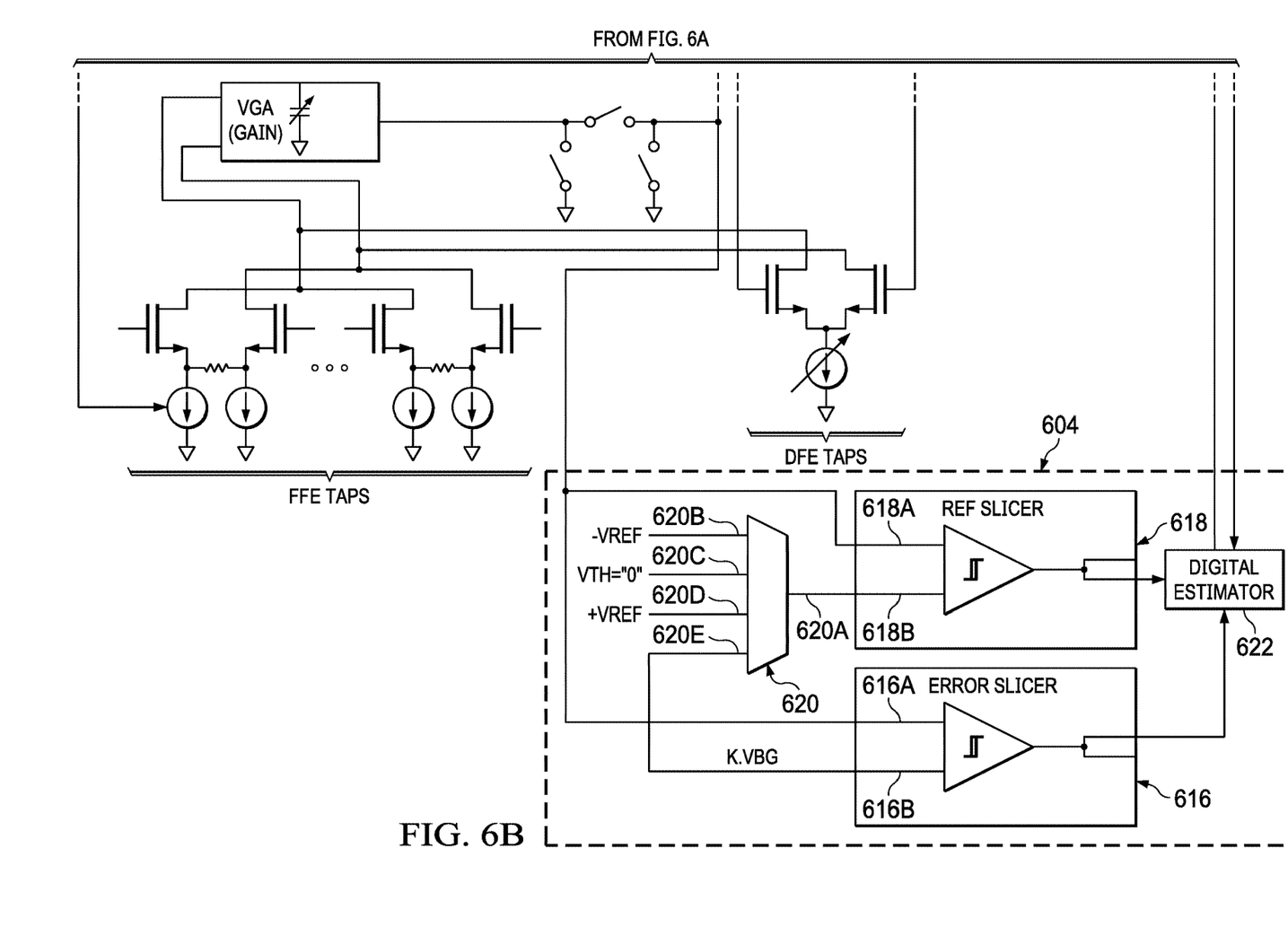

FIGS. 6A and 6B shows an example bias circuit 602 applied in an equalization circuit in accordance with the present disclosure. The bias circuit 602 generates a bias current that keeps I/C constant by tracking variation in capacitance (C) with process, temperature, voltage, and/or clock rate. The bias circuit 602 includes an amplifier circuit 606, a replica capacitor 608, a switch 610, a switch 612, and a switch 614. The bias circuit 602 applies the INTEGRATE signal 502 to control the switches 610, 612, and 614 to generate a voltage on the replica capacitor 608. The replica capacitor 608 is similar to the programmable capacitor 424. The amplifier circuit 606 compares the voltage on the replica capacitor 608 to the voltage VBG and adjusts the bias current to correct any difference. The current charging the replica capacitor 608 is mirrored to the FFE circuit 402 and the DFE circuit 404.

The switch 610 includes a terminal 610A coupled to an output of the amplifier circuit 606, and a second terminal 610B coupled to the replica capacitor 608. The switch 612 includes a terminal 612A coupled to the terminal 610B of the switch 610, and a terminal 612B coupled to an inverting input of the amplifier circuit 606. The switch 614 includes a terminal 614A coupled to the terminal 610A of the switch 610, and a terminal 614B coupled to the ground rail.

FIG. 6B also shows a reference slicer circuit 604 that provides offset correction to the DFE circuit 404. The reference slicer circuit 604 includes an error slicer 616, a reference slicer 618, and a multiplexer 620. The error slicer 616 includes an input 616A coupled to the signal input 404A of the DFE circuit 404. The reference slicer 618 includes an input 618A coupled to the signal input 404A of the DFE circuit 404, and a reference input 618B coupled to an output 620A of the multiplexer 620. The reference slicer 618 compares the signal at the signal input 404A of the DFE circuit 404 to a reference slicer reference voltage provided by the multiplexer 620. The multiplexer 620 inputs 620B, 620C, and 620D that are connected to accurate references generated by a resistance ladder. The input 620B is coupled to an output of the resistance ladder that provides—VREF=+⅔(VFS) which is the expected value at the reference input 426A of the slicer 426. The input 620C is coupled to an output of the resistance ladder that provides 0 volts which is the expected value at reference input 428A of the slicer 428. The input 620D is coupled to an output of the resistance ladder that provides VREF=+⅔(VFS) which is the expected value at input 430A of the slicer 430. An input 620E of the multiplexer 62 is coupled to the reference input 616B of the error slicer 616 for reception of an error slicer reference voltage. The multiplexer 620 selects a reference slicer reference voltage from the different reference voltages provided at its inputs.

The reference slicer 618 is used as a standard to correlate the outputs of the slicers 426, 428, and 430 and the error slicer 616. The digital estimation circuit 622 generates an offset correction value based on the output of the reference slicer 618, and provides the offset correction value to the slicers 426, 428, and 430 and error slicer 616. Thus, the slicers 426, 428, and 430 are referenced to the reference slicer 618, and I/C error estimated as offset is corrected as slicer offset by the reference slicer circuit 604.

Figure 7:
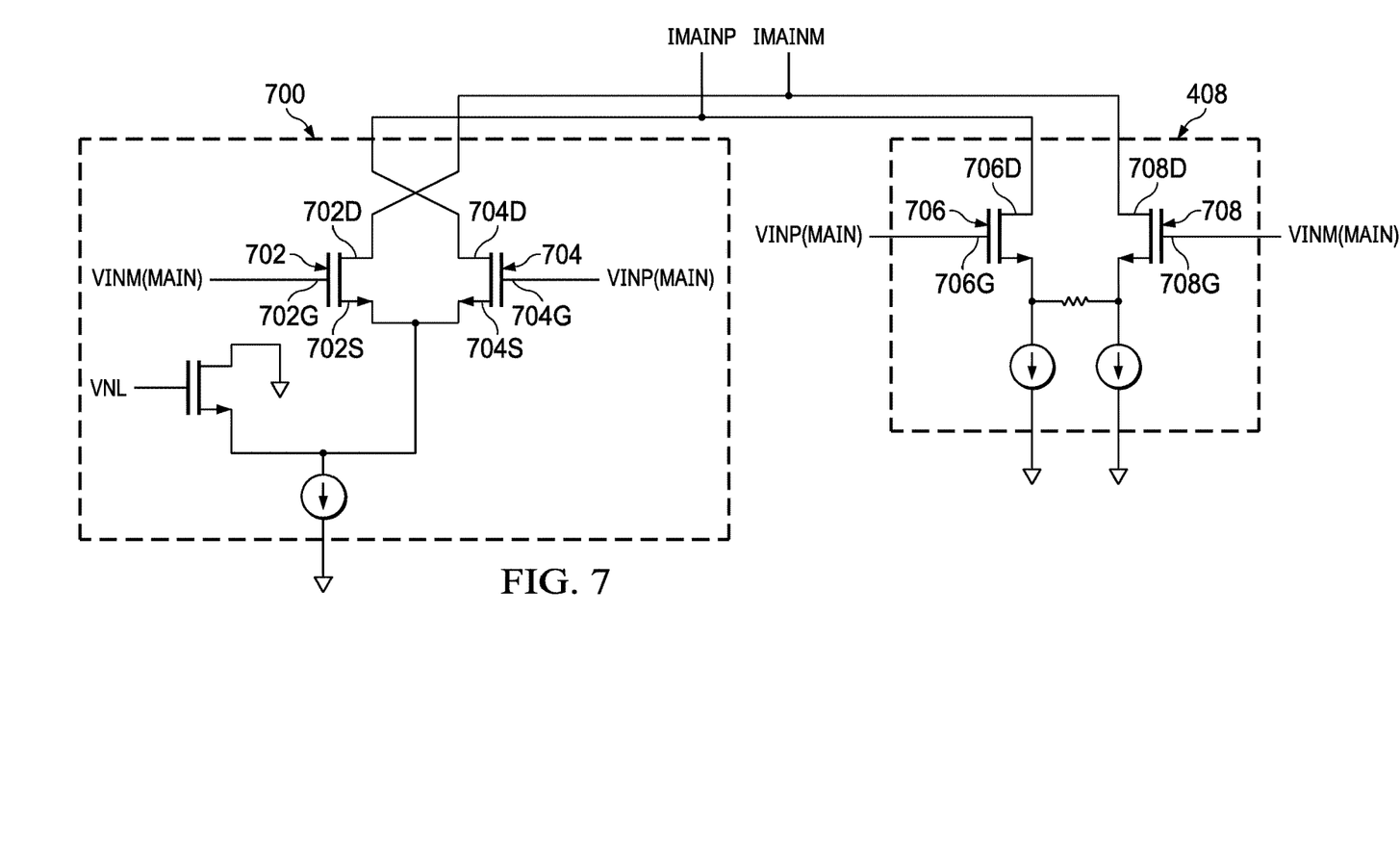
FIG. 7 shows an example non-linearity cancellation circuit applied in an equalization circuit in accordance with the present disclosure.

FIG. 7 shows an example non-linearity cancellation circuit 700 applied in an equalization circuit in accordance with the present disclosure. The non-linearity cancellation circuit 700 is coupled to the main FFE tap 408 of the equalization circuit 400. The non-linearity cancellation circuit 700 includes a transistor 702 and a transistor 704. The transistor 702 includes a drain terminal 702D coupled to the drain terminal 708D of the transistor 708, and a gate terminal 702G coupled to the gate terminal 708G of the transistor 708. The transistor 704 includes a drain terminal 704D coupled to the drain terminal 706D of the transistor 706, and a gate terminal 704G coupled to the gate terminal 706G of the transistor 706. A source terminal 702S of the transistor 702 is coupled to a source terminal 704S of the transistor 704.

Non-linearity causes asymmetry in the three eyes of a received PAM4 signal. The main FFE tap, providing the largest signal from the FFE circuit 402, is the greatest contributor to non-linearity. The non-linearity cancellation circuit 700 is biased to be off with relatively small input signals, and turns on when the input signal swing is large to produce >50 decibels of gain compression thereby decreasing the non-linearity contribution of the main FFE tap.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. An equalization circuit, comprising:
a feed-forward equalization (FFE) circuit comprising:
a first FFE tap and a second FFE tap coupled to the first FFE tap; and
a variable gain amplifier comprising:
an input coupled to the first FFE tap and the second FFE tap; and
a programmable capacitor coupled to the input; and
a decision feedback equalization (DFE) circuit comprising:
a signal input coupled to the variable gain amplifier;
a DFE tap coupled to the input of the variable gain amplifier.

2. The equalization circuit of claim 1, wherein a capacitance of the programmable capacitor is changeable to adjust a gain of the variable gain amplifier.

3. The equalization circuit of claim 1, wherein currents output from the first FFE tap, the second FFE tap, and the DFE tap are summed at the input of the variable gain amplifier.

4. The equalization circuit of claim 1, wherein the DFE circuit comprises:
a first slicer circuit coupled to the signal input of the DFE circuit;
a second slicer circuit coupled to the signal input of the DFE circuit; and
a third slicer circuit coupled to the signal input of the DFE circuit.

5. The equalization circuit of claim 4, further comprising:
a reference circuit comprising:
a reference voltage source;
a first switch comprising:
a first terminal coupled to a first output of the reference voltage source; and
a second terminal coupled to a reference input of the first slicer circuit;
a second switch comprising:
a first terminal coupled to the first terminal of the first switch; and
a second terminal coupled to a ground rail; and
a third switch comprising:
a first terminal coupled to the second terminal of the first switch; and
a second terminal coupled to the ground rail;
a fourth switch comprising:
a first terminal coupled to a second output of the reference voltage source; and
a second terminal coupled to a reference input of the second slicer circuit;
a fifth switch comprising:
a first terminal coupled to the first terminal of the fourth switch; and
a second terminal coupled to the ground rail; and
a sixth switch comprising:
a first terminal coupled to the second terminal of the fourth switch; and
a second terminal coupled to the ground rail.

6. The equalizer circuit of claim 5, further comprising:
an error slicer coupled to the signal input of the DFE circuit;
a reference slicer coupled to the signal input of the DFE circuit;
a multiplexer comprising:
a first input coupled to a first output of a resistance ladder;
a second input coupled to a second output of the resistance ladder;
a third reference input coupled to a third output of the resistance ladder;
a fourth reference input coupled to a reference input of the error slicer; and
an output coupled to a reference input of the reference slicer.

7. The equalization circuit of claim 1, further comprising:
a first switch comprising:
   a first terminal coupled to the variable gain amplifier; and
   a second terminal coupled to the signal input of the DFE circuit;
a second switch comprising:
   a first terminal coupled to the first terminal of the first switch; and
   a second terminal coupled to a ground rail; and
a third switch comprising:
   a first terminal coupled to the second terminal of the first switch; and
   a second terminal coupled to the ground rail.

8. The equalizer circuit of claim 1, further comprising:
a bias circuit comprising:
   an amplifier circuit;
   a replica capacitor;
   a first switch comprising:
      a first terminal coupled to the replica capacitor; and
      a second terminal coupled to the amplifier circuit;
   a second switch comprising:
      a first terminal coupled to the first terminal of the first switch; and
      a second terminal coupled to the amplifier circuit; and
   a third switch comprising:
      a first terminal coupled to the second terminal of the first switch; and
      a second terminal coupled to the ground rail.

9. The equalizer circuit of claim 1, further comprising:
a non-linearity cancellation circuit coupled to the first FFE tap, and comprising:
   a first transistor comprising:
      a drain terminal coupled to a drain terminal of a first transistor of the first FFE tap; and
      a gate terminal coupled to a gate terminal of the first transistor of the first FFE tap; and
   a second transistor comprising:
      a drain terminal coupled to a drain terminal of the second transistor of the first FFE tap;
      a gate terminal coupled to a gate terminal of the second transistor of the first FFE tap; and
      a source terminal coupled to a source terminal of the first transistor of the non-linearity cancellation circuit.

10. A receiver equalization circuit, comprising:
a feed-forward equalization (FFE) circuit comprising:
   two or more FFE taps; and
   a variable gain amplifier comprising:
      an input coupled to the two or more FFE taps; and
      a programmable capacitor, wherein the variable gain amplifier is configured to change gain by changing a capacitance of the programmable capacitor; and
a decision feedback equalization (DFE) circuit comprising:
   a signal input coupled to an output the variable gain amplifier; and
   a DFE tap coupled to the input of the variable gain amplifier.

11. The receiver equalization circuit of claim 10, wherein the variable gain amplifier is configured to apply a sum of currents received from the two or more FFE taps and the DFE tap to charge the programmable capacitor.

12. The receiver equalization circuit of claim 10, wherein the DFE circuit comprises:
   a first slicer circuit configured to compare a signal received from the variable gain amplifier to a first reference voltage;
   a second slicer circuit configured to compare the signal received from the variable gain amplifier to a second reference voltage; and
   a third slicer circuit configured to compare the signal received from the variable gain amplifier to a third reference voltage.

13. The receiver equalization circuit of claim 12, further comprising:
   an error slicer coupled to the signal input of the DFE circuit;
   a multiplexer configured to select a reference slicer reference voltage from the first reference voltage, the second reference voltage, the third reference voltage, and an error slicer reference voltage; and
   a reference slicer configured to compare the signal received from the variable gain amplifier to the reference slicer reference voltage.

14. The receiver equalization circuit of claim 12, further comprising: a first switch configured to connect the output of the variable gain amplifier to an input of the first slicer circuit, an input of the second slicer circuit, and an input of the third slicer circuit.

15. The receiver equalization circuit of claim 14, further comprising a reference circuit configured to generate the first reference voltage and the second reference voltage based on a same clock as applied to control the first switch.

16. The receiver equalization circuit of claim 15 further comprising a bias circuit configured to:
   track variation of the first reference voltage due to variation of a capacitance of the programmable capacitor clock rate, process, voltage, or temperature; and
   generate a bias current for the FFE circuit, the DFE circuit, and the reference circuit.

17. The receiver equalization circuit of claim 10, further comprising a non-linearity cancellation circuit coupled to a main FFE tap and configured to reduce a non-linearity of the main FFE tap.

18. An equalizer-circuit comprises:
a linear equalizer circuit;
a feed-forward equalization (FFE) circuit comprising:
   an input coupled to an output of the linear equalizer circuit;
   a first FFE tap and a second FFE tap coupled to the first FFE tap;
   a variable gain amplifier comprising:
      an input coupled to the first FFE tap and the second FFE tap;
      a programmable capacitor coupled to the input of the variable gain amplifier, and configured to change capacitance to adjust a gain of the variable gain amplifier;
   a first switch comprising a first terminal coupled to an output of the variable gain amplifier;
   a second switch comprising:
      a first terminal coupled to the first terminal of the first switch; and
      a second terminal coupled to a ground rail; and
   a third switch comprising:
      a first terminal coupled to a second terminal of the first switch; and
      a second terminal coupled to the ground rail;

a decision feedback equalization (DFE) circuit comprising:
  a first slicer circuit coupled to the second terminal of the first switch;
  a second slicer circuit coupled to the second terminal of the first switch;
  a third slicer circuit coupled to the second terminal of the first switch;
  a DFE tap coupled to the input of the variable gain amplifier; and
a reference circuit comprising:
  a reference voltage source;
  a first switch comprising:
    a first terminal coupled to a first output of the reference voltage source; and
    a second terminal coupled to a reference input of the first slicer circuit;
  a second switch comprising:
    a first terminal coupled to the first terminal of the first switch of the reference circuit; and
    a second terminal coupled to a ground rail; and
  a third switch comprising:
    a first terminal coupled to the second terminal of the first switch of the reference circuit; and
    a second terminal coupled to the ground rail;
  a fourth switch comprising:
    a first terminal coupled to a second output of the reference voltage source; and
    a second terminal coupled to a reference input of the second slicer circuit;
  a fifth switch comprising:
    a first terminal coupled to the first terminal of the fourth switch of the reference circuit; and
    a second terminal coupled to the ground rail; and
  a sixth switch comprising:
    a first terminal coupled to the second terminal of the fourth switch of the reference circuit; and
    a second terminal coupled to the ground rail.

19. The equalizer circuit of claim 18, wherein the variable gain amplifier is configured to apply a sum of currents provided by the first FFE tap and the second FFE tap and the DFE tap to charge the programmable capacitor.

20. The equalizer circuit of claim 18, further comprising:
an error slicer coupled to the second terminal of the first switch of the FFE circuit;
a reference slicer coupled to the second terminal of the first switch of the FFE circuit;
a multiplexer comprising:
  a first input coupled to the reference input of the first slicer circuit;
  a second input coupled to the reference input of the second slicer circuit;
  a third reference input coupled to a reference input of the third slicer circuit;
  a fourth reference input coupled to a reference input of the error slicer; and
  an output coupled to a reference input of the reference slicer.

21. The equalizer circuit of claim 18, further comprising:
a bias circuit comprising:
  an amplifier circuit;
  a replica capacitor;
  a first switch comprising:
    a first terminal coupled to the replica capacitor; and
    a second terminal coupled to the amplifier circuit;
  a second switch comprising:
    a first terminal coupled to the first terminal of the first switch; and
    a second terminal coupled to a ground rail; and
  a third switch comprising:
    a first terminal coupled to the second terminal of the first switch; and
    a second terminal coupled to the ground rail.

22. The equalizer circuit of claim 18, further comprising:
a non-linearity cancellation circuit coupled to the first FFE tap, and comprising:
  a first transistor comprising:
    a drain terminal coupled to a drain terminal of a first transistor of the first FFE tap;
    a gate terminal coupled to a gate terminal of a second transistor of the first FFE tap; and
  a second transistor comprising:
    a drain terminal coupled to a drain terminal of the second transistor of the first FFE tap;
    a gate terminal coupled to a gate terminal of the first transistor of the first FFE tap; and
    a source terminal coupled to a source terminal of the first transistor of the non-linearity cancellation circuit.

\* \* \* \* \*